April 15, 1952  J. S. NEALE  2,593,335
PITCH CONTROLLING MEANS FOR ROTOR BLADES OF HELICOPTERS
Filed April 7, 1948  4 Sheets-Sheet 1

INVENTOR
JOHN SIDNEY NEALE
By Haseltine Lake+Co.
AGENTS

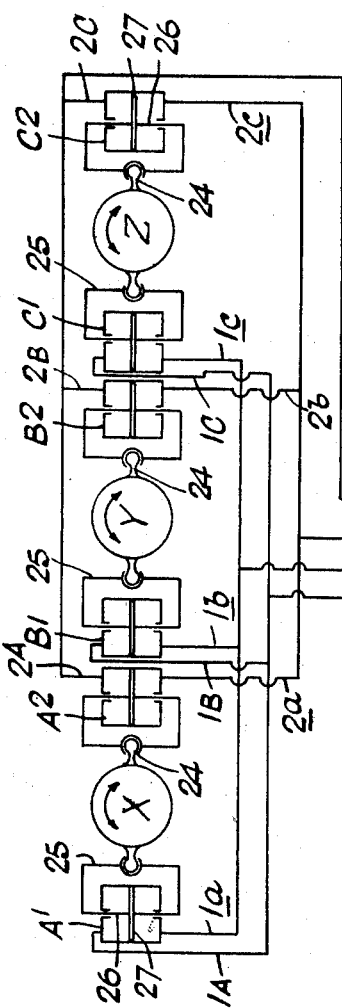
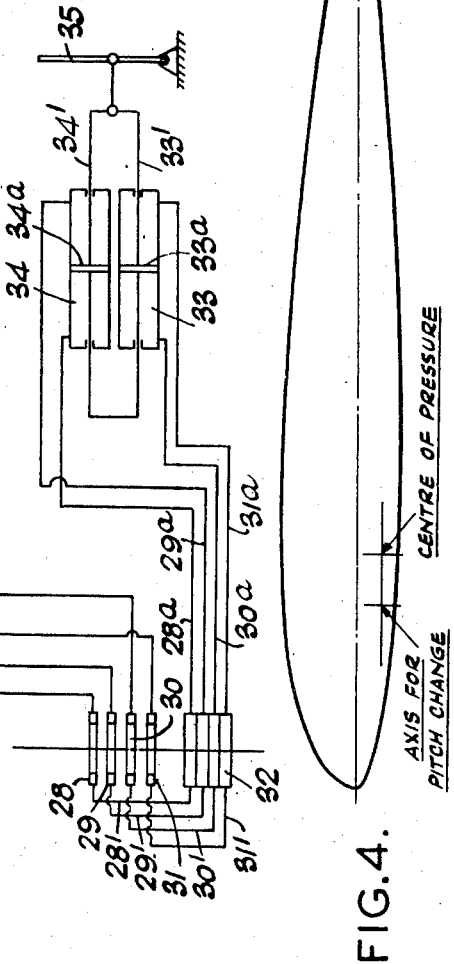

April 15, 1952 J. S. NEALE 2,593,335
PITCH CONTROLLING MEANS FOR ROTOR BLADES OF HELICOPTERS
Filed April 7, 1948 4 Sheets-Sheet 4

INVENTOR
JOHN SIDNEY NEALE
By Haseltine Lake + Co
AGENTS

Patented Apr. 15, 1952

2,593,335

UNITED STATES PATENT OFFICE 2,593,335

PITCH CONTROLLING MEANS FOR ROTOR BLADES OF HELICOPTERS

John Sidney Neale, Manchester, England, assignor to Pennine Aircraft Limited, Manchester, England, a British company Application April 7, 1948, Serial No. 19,473
In Great Britain December 22, 1947

4 Claims. (Cl. 170—160.25)

This invention relates to rotor heads for helicopters in which a plurality of blades radiating therefrom are so connected to the head as to be capable of a restricted flapping, the invention being more particularly concerned with the controlling of the pitch on the blades in an arrangement in which the blades are individually and automatically adjustable in pitch and also can be controlled by remote control means for adjusting their pitch in unison. For example, the present invention is particularly apt when applied to helicopter rotor heads with blades or wings having flapping hinges, and if desired the blades or wings can be provided with drag hinges.

According to the present invention there is provided a hydraulically operated blade pitch control system for helicopter blades embodying a constant volume hydraulic system responsive to aerodynamic forces to effect cyclical pitch change of the blades and having combined therewith means remotely controllable for obtaining collective pitch control of the blades, the hydraulic means for effecting a cyclical automatic pitch change and a collective pitch control operating upon the blade roots outside the axes about which the blades are adapted to move within restrained limits to acord a flapping action for the individual blades, cushioning means yieldingly opposing the flapping action of the blades and tending to maintain the blade root axes in normal operative position.

In one embodiment of the present invention, the blade roots are fixed in housings having axes radiating from the axis of rotation of the rotor head and journalled for rotation about such axes, each such housing having associated therewith a pair of cylinders accommodating plungers effectively connected to diametrically opposed points of the housing, the plurality of pairs of cylinders being connected by pipe lines to remote control means for preselecting the pitch of all of the blades simultaneously and also being inter-connected by pipe lines in such manner as to produce the aforesaid cyclical pitch change. The housings are journalled on brackets pivotally connected to the rotor head for obtaining flapping movement of the blades about axes in a common plane normal to the axis of rotation of the head, such brackets being connected to means for damping down the flapping operation.

In addition to providing for flapping movement within a restrained arc as aforesaid, means can be provided to allow for individual displacement of the blades in response to drag, that is, to obtain an appropriate degree of drag movement, and for this purpose instead of pivotally connecting each said housing to the rotor head by a single axis providing for flapping as aforesaid, this connection can include a pair of pivots with their axes perpendicular to each other, e. g. by providing a pair of brackets having interengaging lugs receiving a vertical pivot pin about the axis of which the appropriate blade is adapted to oscillate in response to drag, this axis being outside the other axis relative to the axis of the rotor head shaft. In such an arrangement the outer bracket elements of the complete set are inter-connected by damping devices for restraining within the desired limits the amount of drag permissible for each blade.

In order that the invention may be clearly understood and readily carried into effect, drawings are appended hereto illustrating embodiments thereof, and wherein:

Figure 3 is a diagrammatic view showing a suitable hydraulic circuit for obtaining the aforesaid automatic cyclical pitch change and also remote control of the pitch change.

Figure 4 is a diagrammatic sectional end view through a blade showing a suitable relationship of axis of movement for obtaining pitch change and normal centre of pressure.

Figure 1:
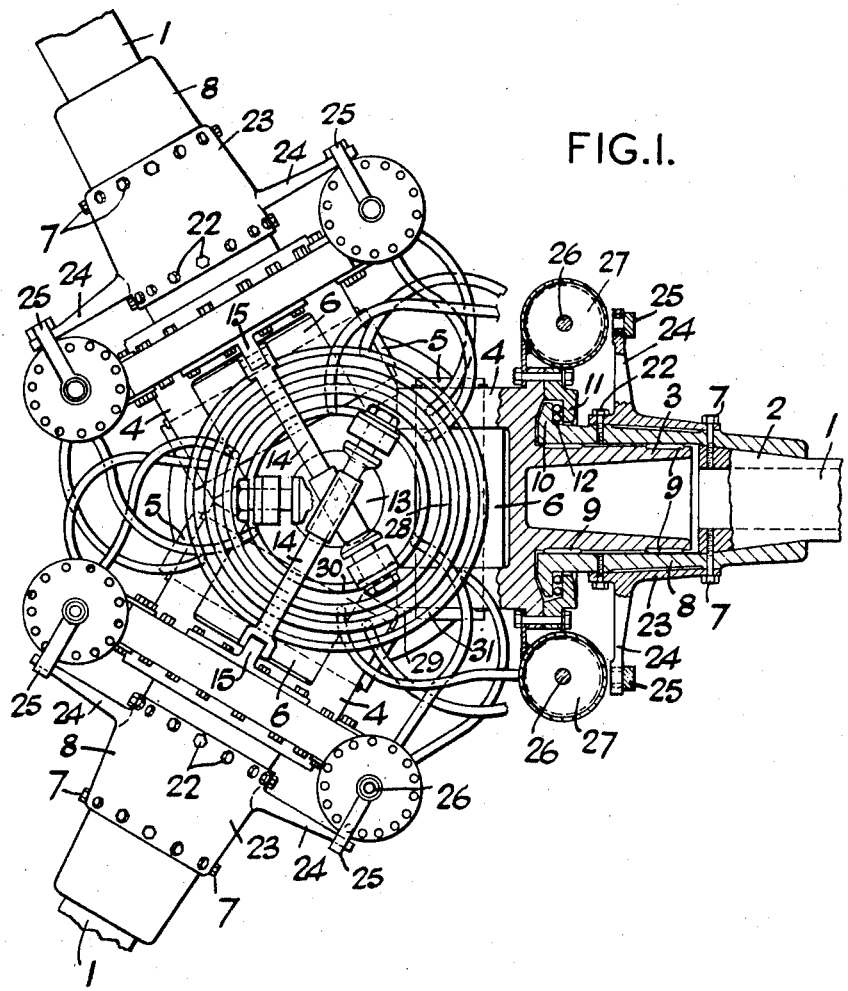
Figure 1 is a part sectional plan view of a rotor head in which provision is made for the flapping of the individual blades in conjunction with relatively outwardly disposed hydraulic means for varying the pitch of the blade.

Referring to the drawings, the blades are indicated by the reference numeral 1 and each has a tapered root end 2 of truncated conical form nesting within a cylindrical housing 8 disposed around an elongated centre boss 3 of a U-shaped bracket 4, three of such blades being shown and consequently a corresponding number of brackets 4 being employed. The furcations of the brackets 4 receive pivot pins 5 secured between their ends in short radial arms 6 of the rotor head, the axes of the pins 5 each providing the axis of displacement of the associated blade for obtaining a flapping action. The blades are secured by screws 7 in the cylindrical housings 8 supported upon the elongated hubs 3 through the medium of needle or roller bearings 9 and having flanged inner ends 10 between which and annular plates 11 secured to the brackets 4 are interposed ball bearings 12 acting as thrust bearings.

With the aforesaid manner of connecting the blades to the rotor head it will be evident that each blade is mounted to pivot about an axis radial with respect to the rotor shaft 13 for changing its pitch and about the axis of the appropriate pivot pin 5 to provide the desired degree of flapping action, whilst the means for obtaining pitch change of the blades is disposed outside the "flapping" pivot axes, as hereinafter described.

Figure 2:
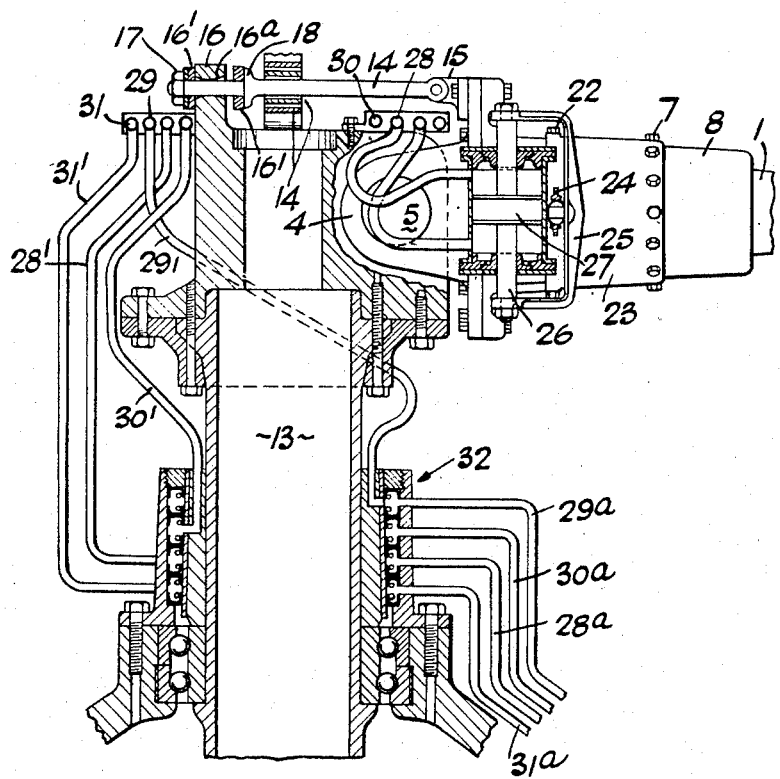
Figure 2 is a sectional elevation of Figure 1 showing a suitable manner of obtaining a rotary oil seal for connecting the pitch adjusting hydraulic means on the rotor head to the remote control means.

The flapping action is restricted to within the desired limits by any suitable damping device means, such as, e. g. the provision with each blade of a rod 14 pivoted at one end to a lug 15 on the appropriate bracket 4 and guided at its other end through a lug 16 on the rotor head, the bore of each lug 16 being flared arcuately, as shown at 16a in Figure 2, to afford a limited degree of oscillation or articulation of the rod 14 in response to the flap of the associated blade, rubber buffers 16' being interposed between each lug 16 and a nut 17 on the outer end of the appropriate rod 14 and a flange 18 inside the lug 16 relatively to the axis of the rotor head.

In order that the rods 14 may not interfere with each other, at the point where they cross, one of the rods is made solid, the second rod is bifurcated to allow free passage of the said solid rod and the third rod is so bifurcated as to allow free passage of both the other said rods (see Figure 2). There is considerable clearance between the said rods at the said point in order that they may function without mutual interference.

The means for obtaining cyclical pitch change comprises a number of pairs of cylinders carried by the brackets 4 and correspond in number of pairs to the number of blades, e. g. three pairs as shown for three blades, the three pairs of cylinders being indicated at A1, A2, B1, B2, and C1, C2 the reference letters A, B and C being distinctive to associated blades (see Figure 3).

Each housing 8 has fixed thereto by the screw 7 and 22 a collar 23 from which extends at diametrically opposed points a pair of arms 24 which act as rocker arms for connection to wide U-shaped yokes 25 connected at their ends to piston rods 26 slidable through the ends of the associated cylinders A1, etc., each piston rod carrying a piston 27 having a normal position midway between the ends of the cylinder.

Each of the cylinders is connected at its ends by a pair of flexible pipe lines to a pair of annular tubes 28 and 29 or a pair of annular tubes 30 and 31, these tubes being arranged in concentric relationship as shown in Figure 1 of the drawings, or if desired, superposed as a tier of tubes. It will be seen by reference to Figure 3 of the drawings that the cylinders A1, B1 and C1 are connected at one end by pipe lines 1A, 1B and 1C to the ring 28, and at their other end by pipe lines 1a, 1b and 1c to the ring 29, whilst the cylinders A2, B2 and C2 are connected at one end by lines 2A, 2B and 2C to the ring 30, and at their other end by lines 2a, 2b and 2c to the ring 31. The rings 28 and 29 are connected by lines 28', 29' to a junction box 32 which also receives lines 30' and 31' leading from the rings 30 and 31 respectively. This junction box embodies any suitable form of rotary seal device whereby the lines 28', 29', 30' and 31' can move round with the rotor head, and lines 28a, 29a, 30a and 31a can extend from such junction box and remain stationary relatively to the rotor shaft for connection to a pair of remote control cylinders 33 and 34 accommodating pistons 33a and 34a respectively which are constantly maintained at identical selected positions in the cylinders 33 and 34 but are displaced by any suitable remote control lever simultaneously, e. g. by connecting their piston rods 33', 34' to common cross heads, one of which can receive an actuating lever 35 or other suitable remote control member adapted to be operated by the pilot.

It will be evident from the foregoing that if one blade changes its pitch, say to "coarse," due to change in its air speed relatively to the others, the others will be set automatically to different degrees of "fine" pitch and vice versa, so that during rotation of the blades about the axis of the main shaft there is a continuous automatic cyclic change in blade pitch due to aerodynamic forces, and that by means of the remote control pistons 33a and 34a the normal or static pitch of all blades can be adjusted simultaneously. For example, taking the centre of pressure (see Figure 4) as the neutral point of an aero-foil, that is the point where if the aerofoil is set at any given incidence in an airstream it will have no torsional moments, it will therefore be possible to set the centre of pressure as a lever arm from a given axis in the same plane and by so doing getting a torsional moment broadly proportional to the lifting force.

It is worth noting that there is normally a movement of the centre of pressure and the position varies with the angle of attack and other conditions, however this can be overcome in design and even used advantageously.

Assuming, as shown, there are three blades, in which as described and shown each blade is identically mounted, and in which the aerodynamic forces on each blade are the same, then the torsional moment engendered will also be identical (hovering condition), and if a constant volume hydraulic system is coupled to the torsional force, there will be no movement in that system and only pressure will be generated.

If the aero-dynamic forces on the blades are not equal (translation condition) then a pressure difference will be made in the hydraulic system and the blade which is "positive" will feed a force into the system so reducing its pitch and torsional force and increasing the pitch and torsional force of the other blades until they equalise.

For example, assuming that the blade X of Figure 3 is moved in a clockwise direction by aero-dynamic forces, this will result in the piston 27 of the cylinder A¹ rising in its cylinder and the co-operating piston in the cylinder A² lowering. Hydraulic fluid displaced by the rising piston 27 will be distributed via the conduit 1A and the conduits 1B and 1C to the upper parts of the cylinders B and C¹, so that hydraulic fluid beneath the pistons in the cylinders B¹ and C¹ will be distributed via the conduits 1ᵇ, 1ᶜ and 1ᵃ to the lower part of cylinder A¹. Clearly, the displaced hydraulic fluid will be so distributed as to enable the blades Y, Z to assume angles of incidence in their respective air streams which are governed by the appropriate aero dynamic forces seeing that the hydraulic volume in the circuit remains constant at any given time for all of the cylinders A¹ to C² irrespective of the simultaneous setting of the blade positions by the remote control lever 35 and the hydraulic means associated therewith.

It is necessary that the mean centre of pressure shall be placed behind the pitch change axis and the torsional moment tend to reduce pitch, although in actual practice the centre of pressure will not necessarily be a constant lever arm along the blade and in fact might be ahead of the pitching axis at one end but not sufficient to effect a positive general tendency for the blade to nose down with lift.

Figures 5, 6:
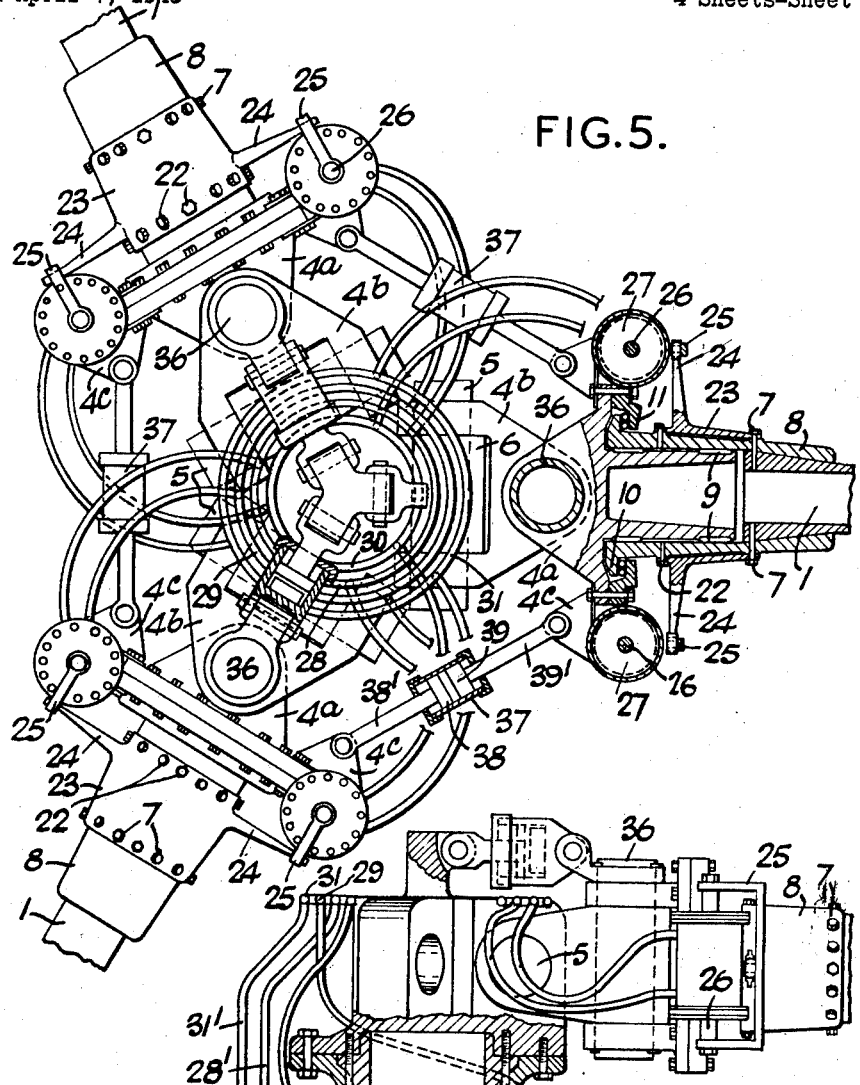
Figure 5 is a part sectional plan view showing a modification in which provision is made for relative flapping and drag pivotal movement of the blades.
Figure 6 is a sectional elevation of Figure 5.

In addition to providing for each blade a damped and restricted flapping motion about an axis between the axis of the main shaft 13 and the circular path of travel generated by the root ends of the blades, there can also be provided, as shown in Figures 5 and 6, means to afford a limited displacement of the blades due to drag, this displacement being about an axis perpendicular to the axis of displacement due to the flapping operation, e. g. about the axis of three pivot pins 36 connecting to brackets 4b to the bifurcated inner sides of brackets 4a to the outer sides of which the housings 8 and cylinders A1–C2 inclusive are connected, the brackets 4b also being bifurcated on their inner sides, e. g. as with the brackets 4 aforesaid, to receive the horizontal axis pivot pins 5 passed through the lugs 6.

With the latter mentioned arrangement, dampers are provided for restraining and controlling the amount of drag, and for this purpose the brackets 4a can be formed with inwardly directed lugs or forks 4c across which are connected the damping devices, each bracket device can comprise an oil cylinder 37 receiving a pair of opposed pistons 38 and 39 respectively to piston rods 38' and 39' to the lugs 4c the pistons 38 and 39 being provided with suitable bleed holes, check valves or other suitable means to obtain the appropriate check action in well known manner.

I claim:

1. In a helicopter rotor, a shaft, a head on the shaft, blades radiating out from the head, a constant volume hydraulically operated blade pitch control system embodying hydraulically actuated devices differentially connected in the hydraulic system and having driving connections to and from the blades, supports for the blade roots, means pivotally connecting said supports to said head about blade flapping axes normal to the shaft axis and between the shaft and the blade roots, a journal bearing member with each support receiving the root of the associated blade, levers connecting the blade roots to said devices by which said devices are operated directly off the blades by the turning of the blades about their root axes due to aerodynamic forces to effect cyclical pitch change of the blades via said differential connection of said devices, remote control driving means additional and common to said devices incorporated in said hydraulic system for effecting via said devices collective actuation of said devices to obtain simultaneous pitch control of the blades, said hydraulically actuated devices being located outside the said flapping axes relative to the shaft axis, and damping means connected to said supports yieldingly opposing the flapping action of the blades and tending to maintain the blade root axes in normal operative position.

2. A helicopter rotor according to claim 1, wherein the said supports for the blade roots are brackets pivoted to the rotor head on axes located in a plane normal to the axis of rotation of the rotor head, a pair of hydraulic cylinders being carried by each bracket, each cylinder accommodating a plunger, the plungers of each pair of cylinders being operatively connected by the said levers to diametrically opposed points of the associated blade roots, conduits connecting the ends of the plurality of pairs of cylinders differentially in the hydraulic system to produce the cyclical pitch change and also to the remote control driving means for preselecting the pitch of all of the blades simultaneously.

3. In a rotor for helicopter with hydraulically operated blade pitch control means, a rotor head, brackets disposed about the rotor head, blades journalled at their roots to said brackets, means pivotally connecting the brackets to the rotor head about blade flapping axes located between the blade roots and the axis of rotation of the rotor head, and transverse with respect to the blade root axes, damping devices connected across the brackets and the rotor head for damping the flapping operations, hydraulically actuated drivers carried by said brackets, a constant volume hydraulic system comprising pipe lines inter-connecting said drivers differentially, and motion transmitting means connecting the blade roots to said drivers transmitting the torsional moments on the blades due to aero-dynamic forces as a pressure difference into the hydraulic circuit of said drivers to effect a cyclical pitch change of the blades.

4. In a rotary wing aircraft a plurality of radiating blades, a shaft to rotate the set of blades about its axis, a head on said shaft, brackets corresponding in number to the number of blades and pivoted to said head on blade flapping axes equidistantly spaced from and in a plane normal to the shaft axis, blade carrying members, blade root journal bearings with said brackets, pivotal connections between said brackets and said blade carrying members with pivot axes normal to the flapping axes and between the blade roots and the said flapping axes, the axes of said journal bearings radiating from the said pivot axes of the blade carrying members, a constant volume motion transmitting hydraulic circuit differentially connecting the root ends of the blades to produce cyclical blade pitch changes due to the varying torques imposed on the roots of the blades by aero-dynamic forces, and a remote control driver operatively connected through said hydraulic circuit to the blade roots to effect collective pitch control of the blades, flapping damping devices connected across said head and said blade carrying members yieldingly opposing flapping action of the blades about said flapping axes, and damping devices connected to the said blade carrying members to control displacement of the blades due to drag.

JOHN SIDNEY NEALE.

REFERENCES CITED

The following references are of record in the file of this patent:

UNITED STATES PATENTS

| Number | Name | Date |
| --- | --- | --- |
| 1,992,015 | Rutherford et al. | Feb. 19, 1935 |
| 2,088,413 | Hafner | July 27, 1937 |
| 2,250,826 | Everts | July 29, 1941 |
| 2,394,846 | Cox | Feb. 12, 1946 |
| 2,435,080 | Hoover | Jan. 27, 1948 |
| 2,439,089 | Hodson | Apr. 6, 1948 |